June 25, 1957     A. BUSKE     2,796,659
BEARING MAKING METHOD
Filed Nov. 2, 1953     6 Sheets-Sheet 1
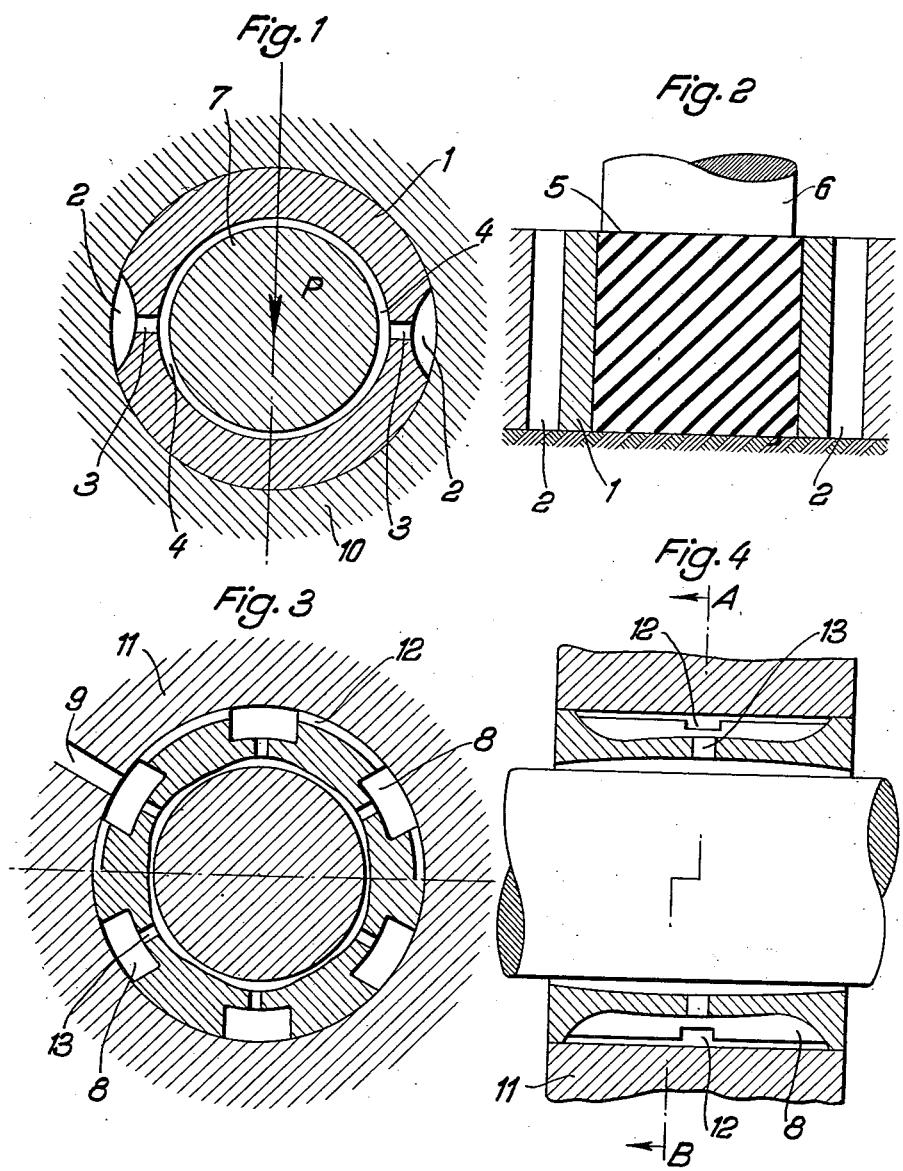
Inventor:
ALFRED BUSKE June 25, 1957  A. BUSKE  2,796,659
BEARING MAKING METHOD Filed Nov. 2, 1953  6 Sheets—Sheet 2

Inventor:
ALFRED BUSKE

Bailey, Stephens + Huettig
ATTORNEYS

June 25, 1957          A. BUSKE          2,796,659
BEARING MAKING METHOD
Filed Nov. 2, 1953          6 Sheets—Sheet 3
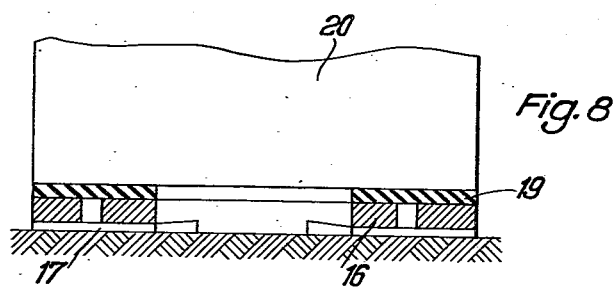
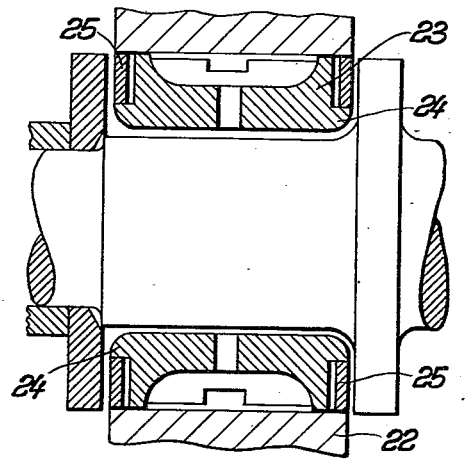
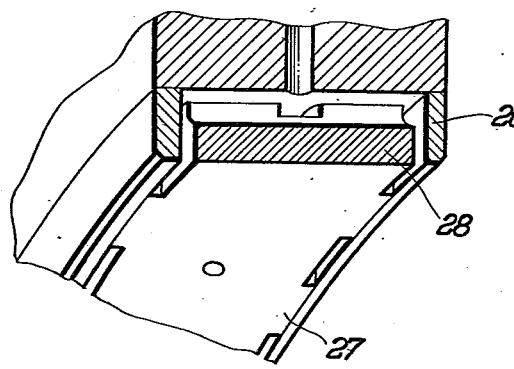
Inventor:
ALFRED BUSKE
Bailey, Stephens & Huettig
ATTORNEYS June 25, 1957  A. BUSKE  2,796,659
BEARING MAKING METHOD
Filed Nov. 2, 1953  6 Sheets-Sheet 4

Inventor:
ALFRED BUSKE
ATTORNEYS

June 25, 1957  A. BUSKE  2,796,659
BEARING MAKING METHOD
Filed Nov. 2, 1953  6 Sheets-Sheet 5
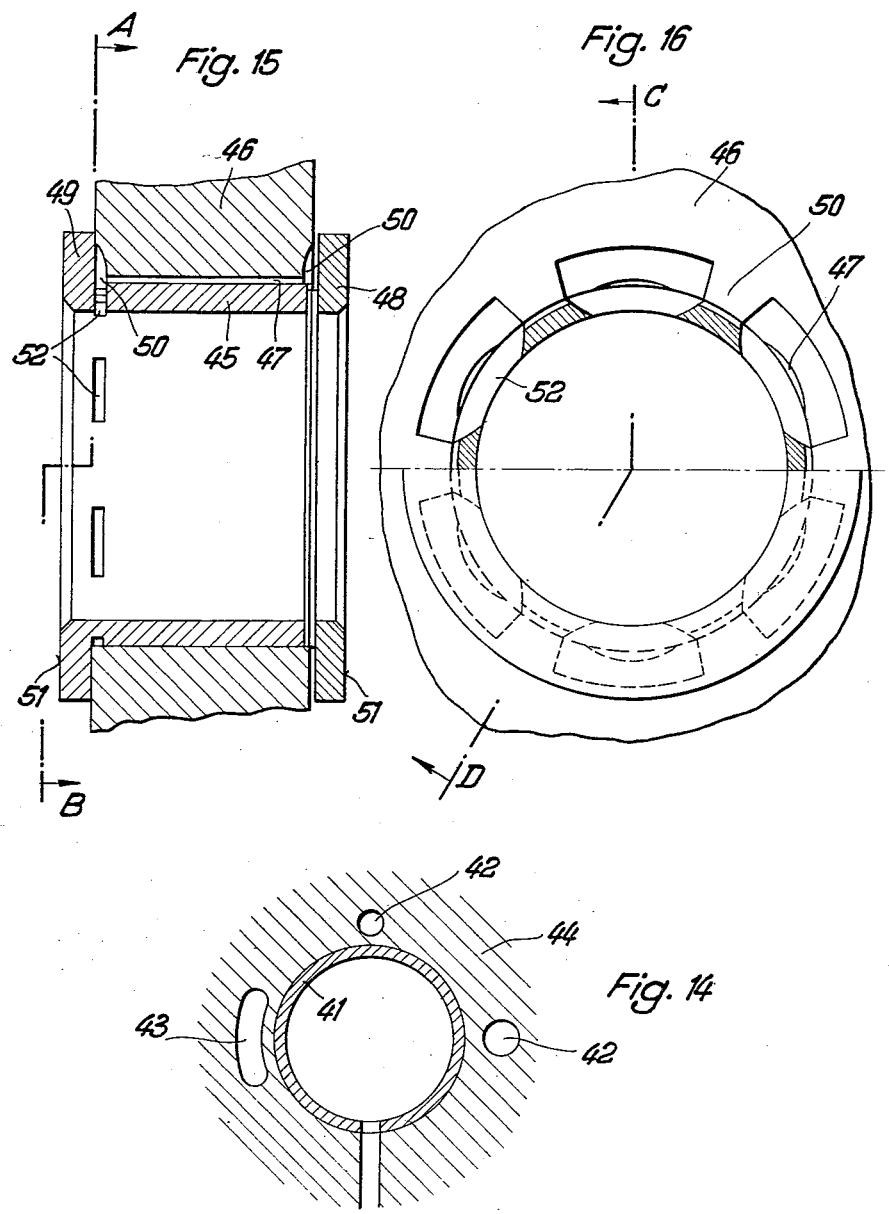
Inventor:
ALFRED BUSKE
Bailey Stephens & Huettig
ATTORNEYS June 25, 1957 A. BUSKE 2,796,659
BEARING MAKING METHOD
Filed Nov. 2, 1953 6 Sheets-Sheet 6
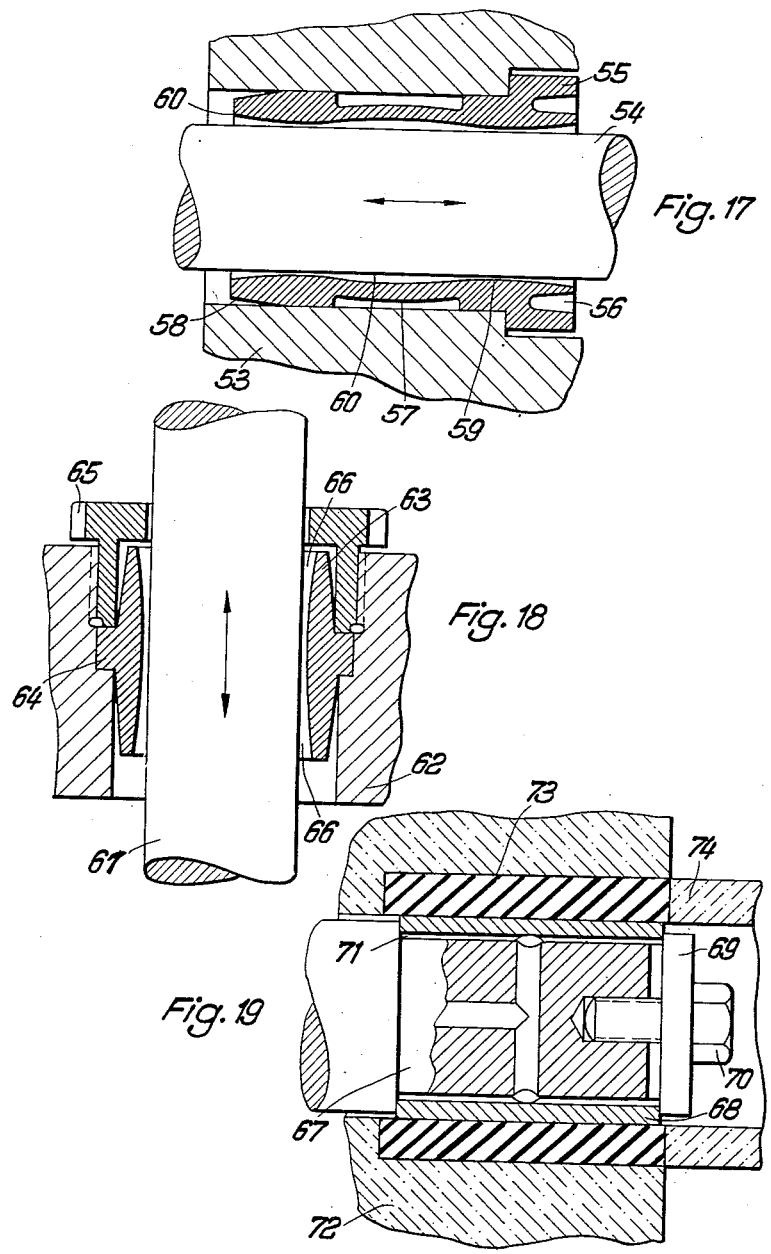
Inventor:
ALFRED BUSKE
Bailey, Stephens & Huettig
ATTORNEYS

United States Patent Office 2,796,659
Patented June 25, 1957

2,796,659

BEARING MAKING METHOD

Alfred Buske, Neckarsulm, Germany

Application November 2, 1953, Serial No. 389,806

Claims priority, application Germany November 7, 1952

3 Claims. (Cl. 29—149.5)

This invention relates to a process for improving the lubricating action in machine elements which are in slidable engagement, or are journalled as in a bearing. In particular, the invention relates both to an improved process of lubrication, and the construction of an improved bearing.

Sliding or journalled surfaces are ordinarily provided with grooves or recesses for the purpose of storing the lubricant and distributing it over the bearing surfaces. The surface of the bearing is interrupted by such grooves or recesses and as a consequence a harmful effect on the distribution of the lubricating film exists. Furthermore, such grooves or recesses fail to provide a hydrodynamic pressure distribution of the lubricant between the surfaces.

An object of the instant invention is to provide for a more even distribution of the lubricant between surfaces in slidable engagement. Another object of the invention is to produce a novel method of forming bearing surfaces by means of which the lubricant is more evenly distributed under hydrodynamic pressure.

In general, these objects are accomplished by constructing bearing surfaces between which are wedge-shaped pockets or recesses, the apex of the wedge lying in the direction of movement of the surfaces. The lubricant in such pockets is more evenly distributed between the bearing surfaces in a manner which does not interfere with the hydrodynamic buoyancy of the lubricating film. The lubricant passes from the wedge-shaped pockets between the bearing surfaces in the form of a continuous wedge with a minimum amount of inclination and with gentle transition with the gradual and gentle merging from the deepest portion of the pockets into the apex of the pockets.

The ordinary methods of cutting grooves will not produce the wedge-shaped pockets contemplated by the instant invention. Consequently, the pockets of the instant invention are formed by the exertion of pressure upon the bearing surface so as to produce the wedge shape. The bearing structure is relatively weakened at the points where the pockets are formed, and these pockets are preferably permanently deformed so that they are effective from the beginning of the use of the bearing.

The means by which the objects of the invention are obtained, are more fully described with reference to the accompanying drawings, in which:

Figure 1 is a cross-sectional view through a bearing constructed according to the invention;

Figure 2 is a cross-sectional view through a bushing and die showing the manner of creating the deformed surfaces;

Figure 3 is a cross-sectional view through a modified form of bearing taken on the line A—B of Figure 4;

Figure 4 is a cross-sectional view of Figure 3;

Figure 8 is a cross-sectional view illustrating the method of forming the bearing of Figure 6;

Figure 9 is a cross-sectional view through another form of bearing;

Figure 5:
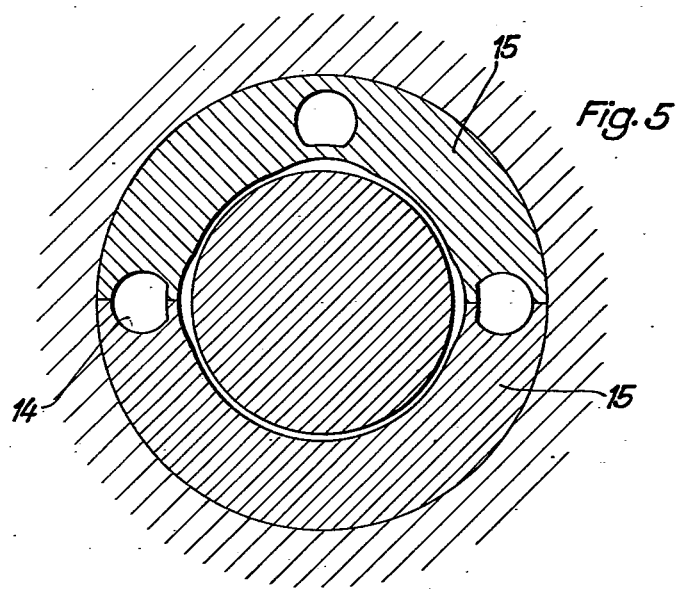
Figure 5 is a cross-sectional view through a further modified form of bearing.

Figures 10 to 18, inclusive, are cross-sectional views through further modified forms of a bearing; and Figure 19 is a cross-sectional view showing the method of forming the deformed surfaces in the bearing.

In Figure 1 the bushing 1 is stressed in the direction indicated by the arrow P. The lubricant is introduced into the spaces formed by grooves 2 in the outer surface of the bushing, which spaces communicate with the inner surface of the bushing through ports 3. In order to permit the lubricant to enter into the space between the inner surface of the bearing and the shaft journalled in the bearing, spaces 4 are created between the inner surface of the bearing and the shaft. As shown in Figure 2 these spaces are formed by inserting a rubber block 5 into the bushing after the grooves 2 have been first formed. A die 6 is used to create a pressure in the axial direction of block 5, and lateral forces are thereby created against the inner wall of bushing 1. As the bushing is relatively weak adjacent grooves 2, the pressure created by die 6 will cause the bushing to bulge outwardly, and substantially form a circular to an elliptical shape, thus creating the spaces 4 as shown in Figure 1. These spaces 4 are thus wedge-shaped, and the apex of the wedge merges very gradually and gently into the cylindrical supporting surface of the bearing, and thus permits the lubricant to have unrestricted access into the loaded section of the bearing, and with a very favorable hydrodynamic pressure distribution of the lubricating film.

The deformation of the bushing to form these spaces 4 can be accomplished by using plastic masses, or other moldable substances such as sand. Liquids can be used, in which case the ports 3 are first made water-tight, or alternatively formed after the deformation has been made. The deformation can be accomplished through the use of hydrodynamic pressure, in which case the bushing 1 is stressed in the direction of the grooves 2 by the shaft 7 as the shaft is being turned, and by highly viscous lubricants used. Due to the rotation of the shaft, hydrodynamic pressures are created in the lubricant which, together with the load on the shaft, reach such magnitudes that the bushing is outwardly deformed opposite grooves 2. Furthermore, the deformation of the bushing can be accomplished by the application of conical mandrels, or the combination of mandrels and balls or rollers, or other solid means such as a pressure bolt or ring.

In Figure 3, which is a cross-section on the line A—B of Figure 4, the bushing is provided with a plurality of longitudinal grooves 8 on the outer surface thereof, which grooves terminate short of the ends of the bushing as shown in Figure 4. After applying a deforming pressure, as described above, an undulating inner surface is formed in the bushing. Bearings of this type are useful in connection with a very small clearance between the shaft 13 and the bushing, particularly in an apparatus where the shaft must be accurately positioned at all times, as in machine tools. This construction is also particularly suited for bearings in which the shaft oscillates through small angles of revolution, such as in bearings for piston pins. Furthermore, the grooves 8 may be curved with respect to the longitudinal axis of the bushing rather than parallel thereto as shown. In these bearings the lubricant is supplied through a port 9 in the housing 11 into the grooves 8 and uniformly distributed to all of the grooves through channels 12 extending over the entire outer circumference of the bushing. The lubricant passes from the channels 8 through ports 13 into the wedge-shaped spaces between the inner surface of the bushing and the shaft. A bearing so constructed is equally effective for both directions of revolution for the shaft.

In Figure 5 the resiliency of the bushing, or the relatively weakened area so as to permit deformation, is accomplished by holes 14 drilled through the bushing 15. As shown the bushing may be formed in two or more sections.

Figure 6:
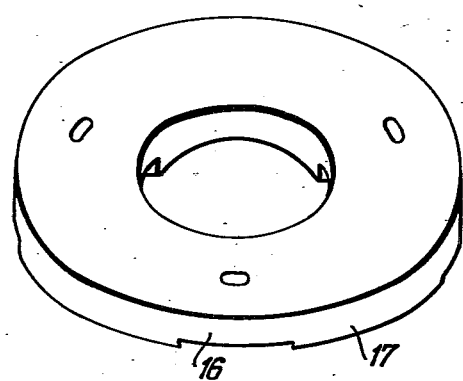
Figure 6 is an isometric view of a modified form of a thrust bearing.
Figure 7:
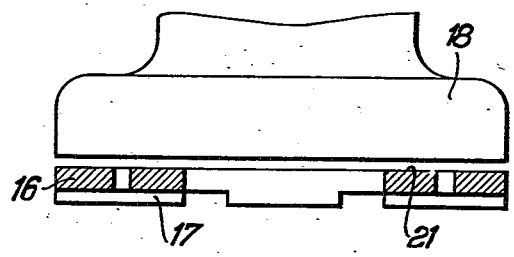
Figure 7 is a cross-sectional view of the bearing of Figure 6 in operative position.

In Figures 6 to 10 the application of the invention to a thrust bearing is illustrated. In Figure 6 the ring 16 has one surface slotted so as to provide ribs 17. In Figure 7 this ring is shown loaded by the shaft 18. In order to produce the wedge-shaped pockets, as shown in Figure 8, a rubber disc 19 is placed upon ring 16, and a die 20 bears against this rubber ring, and the resulting pressure causes the weakened section between ribs 17 to deform so as to form the undulating bearing surface with the wedge-shaped pockets, the apex of the wedges lying in the direction of rotation. Only a surface of this shape is capable of producing hydrodynamic pressures when shaft 18 is rotated.

In Figure 9 the invention is illustrated with respect to surfaces adapted to support both radial and axial loads. The bearing housing 22 contains a bushing 23. The sides of this bushing are rabbeted to form supporting shoulders 24, upon which rings 25 are seated. Bushing 23 is otherwise similar to the bushing 1 of Figure 1, and the thrust rings 25 are formed in the same manner as rings 16 of Figures 6 to 8. By combining these features into a bearing stressed both radially and axially, a very versatile, high strength, inexpensive bearing is obtained. The bushing 23 and thrust rings 25 can be in one piece, or may be divided into several sections. It is further possible to construct the rings 23 without any ribs 17 as shown in Figure 6, and to instead produce ribs 27, with intervening grooves on the sides of the bushing, as shown in Figure 10.

Figure 11:
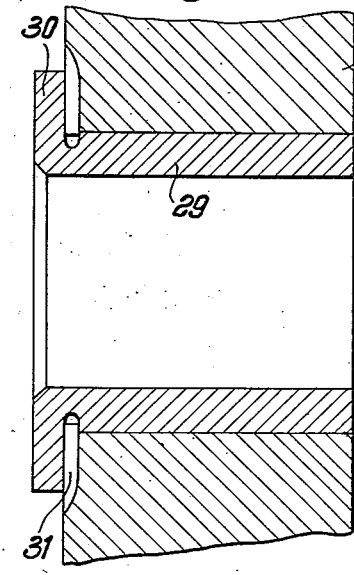
Figure 12:
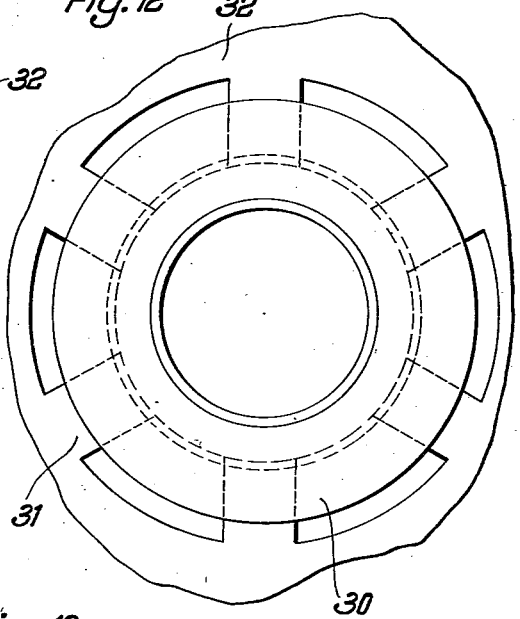

In Figures 11 and 12 the bushings 29 are formed with a radially extended thrust flange 30. Ribs 31, with intervening grooves, are formed in housing 32 so that the flange can be deformed after being inserted into housing 32 and the wedge-shaped pockets thus created.

Figure 13:
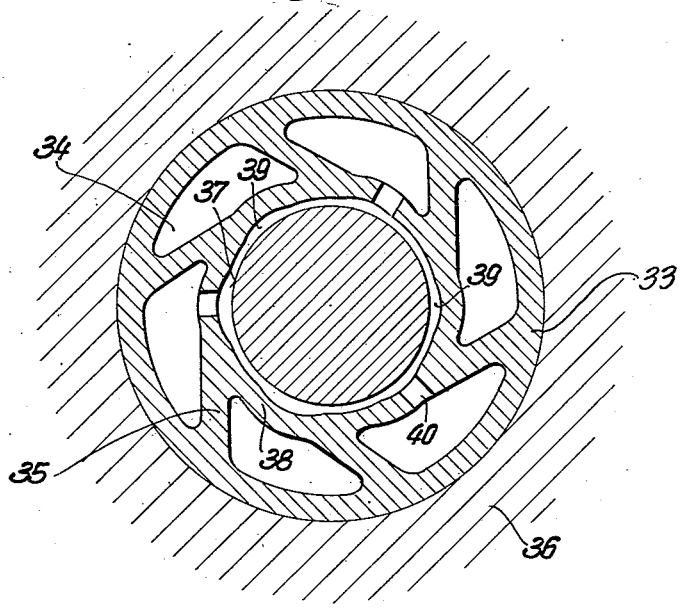

In Figure 13 the bushing 33 has a plurality of longitudinally extending cavities 34, which are separated from each other by ribs 35, which are inclined with respect to the radius of the bushing. The deformation of the inner surface of the bushing can be accomplished in accordance with the methods heretofore described. If, however, the bushing is constructed of a material which has a co-efficient of expansion greater than that of the housing 36, the inner bearing surface 37 of the bushing can be deformed to form the wedge-shaped pockets on its own accord because of the temperatures created when the bearing is used. Ribs 35 can expand primarily only in the direction toward surface 37 when heated, since the housing 36 will not permit an outwardly directed expansion. This condition causes a slight twisting of the inner wall of the bushing in the direction of ribs 35. These ribs bend easily due to the forces created by the heat expansion of wall 38, and an equilibrium is created between the outwardly directed heat expansion forces on the one hand, and the oppositely acting bending forces on the other hand. However, immediately adjacent the cavities 34, the wall 38 can expand freely outwardly, and thus deformations 39 are formed in the surface 37. Lubricant is introduced into these wedge-shaped pockets 39 through ports 40. Because of the partially obstructed heat expansion of wall 38, the bearing clearance will vary only slightly within wide limits of operating conditions, and this particular construction makes possible a very accurate journalling of the shaft over wide ranges of speeds of rotation. Changes in the bearing clearances with temperature can be effected by variations in the co-efficient of expansion of the material of which the bearing is made, and by changes in dimensions, as well as the angle of inclination of the ribs 35.

In Figure 14 the invention is illustrated with respect to a thin walled bushing 41. In order to permit the deformation of the inner surface of this bushing to form the wedge-shaped pockets, cavities 42 and 43 of different sizes are drilled in housing 44. The resiliency of the relatively weakened walls of the housing between the housing and the bushing permits the bushing to be deformed in accordance with the aforesaid described methods to form the wedge-shaped pockets.

In Figs. 15 and 16 a further form of bushing is shown for receiving both axial and radial pressures, Figure 15 being a section along the line C—D of Figure 16, and Figure 16 being a section on the line A—B of Figure 15. In order to form the wedge-shaped pockets in bushing 45, housing 46 is provided with grooves 47 at the points where the wedge-shaped pockets are to be formed in the inner surface of the bushing 45. The wedge-shaped pockets are then formed by producing pressure against the inner surface of bushing 45. Thrust rings 48 and 49 are seated upon the sides of housing 46, which is provided with ribs 50 with intervening grooves, so that these rings can be deformed to form the wedge-shaped pockets as has been described, these pockets appearing in the surfaces 51 of the aforesaid rings. In order to form outwardly convex pockets in the area between the rings and the main body of the bushing 45, grooves 52 are provided.

The process of the invention can be applied to transverse and longitudinal bearings, as well as to flat bearing surfaces or to bushings for rods or tubes having a circular or a profiled cross-section to obtain all types and shapes of lubricating pockets. Such pockets can be positioned in any desired direction with respect to the relatively sliding bearing surfaces. It is preferable that the pockets be positioned perpendicular to the direction of sliding, because then the wedge-shaped lubricating films are formed with the necessary and proper hydrodynamic pressure distribution.

In Figure 17 the invention is disclosed with respect to a bushing having a shaft reciprocating therein. Housing 53 supports a shaft 54 journalled in bushing 55. This bushing is provided with cavities 56 and 57, and a bevelled end 58. Upon application of pressure to the inner wall 59 of the bushing, this surface is deformed so as to create the wedge-shaped lubricating pockets 60 which undulate in the direction of the sliding motion.

In Figure 18 a reciprocating shaft 61 is supported in the housing 62 through the medium of the bushing 63. This bushing is tapered from its middle to its ends, and is secured in housing 62 by means of a flange 64. The bushing is held against axial movement by annular threaded nut 65 which is threaded into housing 62. Upon applying pressure to the inner wall of the bushing, in accordance with the invention, lubricating pockets 66 are formed between shaft 61 and the bushing, such pockets providing a satisfactory hydrodynamic pressure distribution of the lubricant.

In Figure 19 the invention is applied to bushings for shafts or pinions. Shaft 67 is seated in a bushing 68 which is held against axial movement by disc 69 which is secured to shaft 67 by bolt 70. On the inner surface of the bushing are longitudinal grooves 71 which are machined into the bushing before it is mounted as shown. To produce the wedge-shaped lubricating pockets, the bushing is inserted into a pressure resistant housing 72, and enclosed by a pressure distributing body such as a rubber ring 73. When die 74 is applied against body 73, the bushing will be deformed at the groove 71 to form the desired wedge-shaped lubricating pockets on the outer bearing surface of the bushing.

Having now described the means by which the objects of the invention are obtained, I claim:

1. A method of making a bearing having a bearing surface with lubricating pockets comprising forming a rigid bearing sleeve with a cylindrical bearing surface and having material removed at spaced points around the sleeve to provide weakened portions, applying material against the bearing surface of said bearing sleeve, pressing the material in the axial direction of the bearing sleeve to expand the material radially against the bearing surface and thereby forcing the latter outwardly at the weakened portions into permanently deformed lubricating pockets in the bearing surface.

2. A method as in claim 1, comprising forming said relatively weakened portions by grooving the bearing wall opposite said bearing surfaces.

3. A method as in claim 1, comprising forming said relatively weakened portions by forming cavities in said wall between said bearing surface and the opposite surface of said wall.

References Cited in the file of this patent

UNITED STATES PATENTS

| | | |
|---|---|---|
| 915,549 | Budd | Mar. 16, 1909 |
| 2,126,688 | Palmgren | Aug. 9, 1938 |
| 2,322,004 | Fast | June 15, 1943 |
| 2,615,764 | Leake | Oct. 28, 1952 |

FOREIGN PATENTS

| | | |
|---|---|---|
| 475,732 | Great Britain | Nov. 22, 1937 |